United States Patent Office 3,019,207
Patented Jan. 30, 1962

---

3,019,207
METHOD OF PRODUCING STABILIZED OIL EXTENDED BUTADIENE-STYRENE RUBBERY COPOLYMER
Grant Crane, Akron, Ohio, assignor to The Firestone Tire & Rubber Company, Akron, Ohio, a corporation of Ohio
No Drawing. Filed May 21, 1956, Ser. No. 585,929
5 Claims. (Cl. 260—33.6)

This invention relates to oil-extended synthetic rubbery polymers and copolymers of a butadiene-1,3, and it especially relates to an oil-extended rubbery copolymer of butadiene and styrene having improved stability upon storage prior to vulcanization.

Oil-extended synthetic rubbers, especially oil-extended GR–S, have become very popular in recent years for a number of reasons. The oils employed commercially are much cheaper than the synthetic rubber itself, so that the oil-extended synthetic rubber is produced at a saving over the straight synthetic rubber. Since the oil employed for extension of the rubber acts as a plasticizer for the rubber, it has been customary to employ stiffer synthetic rubbers for oil-extension than are employed in the absence of oil. For example, commercial GR–S has usually been manufactured with a Mooney plasticity of about 50 to 60 for use without oil extension, whereas the GR–S employed for producing oil-extended polymers usually has an initial Mooney plasticity of at least 85 or 90, and generally exceeds 125. Tire treads produced from the oil-extended rubber of such high initial Mooney plasticity have exhibited very good abrasion resistance, the wear ratings being much higher than would be predicted from a consideration of the diluting effect of the oil on the rubber. Thus, the practice of utilizing oil-extended GR–S for tire treads has become very popular in recent years.

Whereas regular GR–S has presented no great stabilization problems in recent years, the oil-extended polymers have not always responded to conventional GR–S stabilizers. For example, a certain type of oil-extended GR–S produced at one synthetic rubber plant has exhibited satisfactory stability during storage, whereas the same type of oil-extended rubber produced at another plant has given much trouble, especially after storage in the hot summer months, the Mooney plasticities sometimes dropping from the original 55–65 to values of less than 20. Such "soupy" rubber is distinctly undesirable. There has never been a satisfactory explanation of why this oil-extended rubber from one plant has performed well, whereas the same type of rubber from another plant has exhibited poor stability. Perhaps a trace of contaminants has catalyzed the deterioration of the rubber from the one plant. In any event, an urgent need has arisen for a simple and economical method of stabilizing oil-extended synthetic rubbers of the type just discussed.

It is therefore an object of the invention to provide a simple, economical and effective method of stabilizing synthetic rubber. It is also an object to provide improved oil-extended synthetic rubbers. Furthermore, it is an object of the invention to provide economical, effectively stabilized, oil-extended synthetic rubbers readily acceptable by the tire industry.

The objects of the invention are simply and effectively realized by incorporating into oil-extended synthetic rubbers a relatively small amount of a finely divided, light colored, semi-reinforcing, inorganic pigment. Suitable pigments include zinc oxide, magnesium oxide, silicon dioxide and calcium silicate. The fine particle size of these pigments is generally guaranteed by the commercial methods of preparing them, usually involving a precipitation, either in the wet way, or in the case of zinc oxide, precipitation from a gas mixture. The pH of zinc oxide, magnesia and calcium silicate pigments is inherently higher than 7.0. An aqueous dispersion of a relatively small proportion of the finely divided rubber pigment can be admixed with a freshly prepared aqueous dispersion of the rubbery oil-extended synthetic rubber, and the mixture can then be coagulated in a known manner to provide the stabilized oil-extended rubber of the invention.

The invention is illustrated by the following examples:

EXAMPLE 1

A rubbery butadiene-styrene copolymer synthetic rubber was produced in accordance with the specification for GR–S 1710 by aqueous emulsion polymerization in an iron pyrophosphate formula at 5° C. The resulting high-Mooney polymer, in latex form, was conventionally stabilized by addition of 1.25 phr. (parts per 100 parts of the rubber) phenyl-beta-naphthylamine, added as a 20% dispersion containing 2% of the dispersing agent, Daxad No. 11 (sodium salt of condensed alkyl, aryl sulfonic acid). The latex was warmed with gentle mechanical stirring on an electrical hot plate at 50 to 60° C. A high-aromatic oil, 37.5 phr. Shell SPX–97 (aromatic petroleum oil, extender for GR–S) was emulsified to produce a 50% oil dispersion in 2.5% potassium oleate, and the resulting emulsion was separately warmed to 50–60° C. and then mixed into the warm latex. The resulting conventionally stabilized latex was divided into five portions, one portion becoming a control. To each of the other four portions there was added 2.75 phr. (2 parts per 100 parts extended polymer) of zinc oxide (A), magnesium oxide (B), calcium silicate (C) and silicon dioxide having a pH of approximately 8.4 (D), respectively, and each of the four latex preparations was stirred for about 10 minutes.

The control latex and each of the four test latices was separately coagulated by the "shock" (or "lump") method. The warm oil-extended latex was poured with stirring into 4.8 cc./gram of unextended latex of salt-acid solution (4% sodium chloride plus 0.4% sulfuric acid. The volume of salt-acid coagulant was approximately the same as the volume of the unextended latex. Stirring was continued until coagulation was complete. The coagulum was allowed to remain in the serum for about one minute and then was removed and passed through a laboratory pelletizer within about five minutes. The wet pellets were allowed to stand overnight and then were dried eight hours in a 60° C. forced-draft oven. Portions of the dried oil-extended polymers were set aside for determination of the Mooney plasticity. Each polymer was then aged for six hours in a 93.5° C. (200° F.) oven, and a portion of each sample was then taken for Mooney plasticity determination. Aging in the 200° F. oven was continued until a substantial portion of the surface of each polymer was glazed in appearance, at which time the sample was removed from the oven and the final Mooney plasticity determined. The data thus obtained are set out in Table I.

Table I
STABILIZATION OF OIL-EXTENDED GR–S WITH VARIOUS PIGMENTS

| Sample | Initial Mooney Plasticity (ML4) | ML4 After 6 hrs. @ 200° F. | Final ML4 |
|---|---|---|---|
| Control | 63.0 | 40.0 | 19.0 @ 11.8 hrs. |
| A (zinc oxide) | 67.0 | 64.5 | 23.5 @ 24.6 hrs. |
| B (magnesium oxide) | 68.1 | 49.0 | 21.5 @ 24.6 hrs. |
| C (calcium silicate) | 65.2 | 46.0 | 29.5 @ 11.8 hrs. |
| D (silicon dioxide) | 67.2 | 62.0 | 33.0 @ 19.8 hrs. |

It is readily apparent from Table I that the four basic pigments protected the oil-extended rubber appreciably by slowing down the loss in Mooney plasticity value upon heating, the zinc oxide and silicon dioxide being outstanding in their protective effects. The heating period of six hours at 200° F. is considered to be equivalent to several months aging under ordinary storage conditions.

EXAMPLE 2

In the manner described in Example 1, additional tests were made on three commercial samples of zinc oxide, employed in different proportions. The details concerning the various samples and testing results obtained are shown in Table II, in which the percentages of zinc oxide are given in phr. extended polymers.

Table II

| Sample | Original ML4 | ML4 After 6 hrs. @ 200° F. | ML4 Loss/hr. |
|---|---|---|---|
| Control | 61.0 | 52.0 | 1.5 |
| 2.0% zinc oxide (1) | 61.5 | 57.5 | 0.7 |
| 1.0% zinc oxide (1) | 62.5 | 57.5 | 0.8 |
| 0.5% zinc oxide (1) | 61.5 | 58.0 | 0.6 |
| 2.0% zinc oxide (2) | 60.5 | 57.5 | 0.5 |
| 2.0% zinc oxide (3) | 61.0 | 58.0 | 0.5 |

EXAMPLE 3

An oil-extended rubbery polymer of the GR–S 1710 type was produced as in Example 1. A portion was taken as the control, a second portion was stabilized by addition of 1.0 phr. zinc oxide, and a third portion was stabilized by addition of 2.0 phr. zinc oxide. The stabilizing effect of the zinc oxide on this oil-extended rubber is shown in Table IIIA.

Table IIIA

| Oil-Extended Rubber | Initial ML4 | ML4 After 6 hrs. at 200° F. |
|---|---|---|
| Control | 66.5 | 13.0 |
| 1.0 phr. zinc oxide (G) | 65.0 | 62.0 |
| 2.0 phr. zinc oxide (H) | 67.5 | 60.5 |

Portions of the three unaged oil-extended samples of Table IIIA were compounded in a tire tread formula, and the normal physical properties were obtained on the vulcanized rubber compositions. The formulas and test results are shown in Table IIIB.

Table IIIB

| Ingredients | Parts by weight per 100 of unextended rubber | | |
|---|---|---|---|
| | Control Stock | G Stock | H Stock |
| Control Rubber | 137.5 | | |
| G Rubber | | 137.5 | |
| H Rubber | | | 137.5 |
| HAF Carbon Black | 70 | 70 | 70 |
| Zinc Oxide | 3.0 | 2.0 | 1.0 |
| Stearic Acid | 2.0 | 2.0 | 2.0 |
| Processing Oil | 7.0 | 7.0 | 7.0 |
| Sulfur | 2.0 | 2.0 | 2.0 |
| Accelerator | 1.2 | 1.2 | 1.2 |
| Cure 90 minutes @ 280° F. | | | |
| Tensile Strength (p.s.i.) | 3,050 | 3,250 | 3,100 |
| 300% Modulus (p.s.i.) | 1,650 | 1,700 | 1,625 |
| Elongation, percent | 550 | 500 | 520 |

Table IIIA shows the excellent stabilizing effect of zinc oxide on oil-extended synthetic rubber during storage. Table IIIB shows that the zinc oxide-stabilized oil-extended synthetic rubber produces vulcanized rubber compositions fully equivalent in properties to the unstabilized rubber (in this test all rubbers were compounded before aging).

Other high-aromatic oils found to be equivalent to the Shell SPX–97 utilized in the above examples are Sundex 53 (a relatively aromatic hydrocarbon oil for extending GR–S) and Dutrex 20 (aromatic hydrocarbon oil, softener and extender for synthetic rubbers). Additional oils suitable for extending hydrocarbon rubbery butadiene polymers are disclosed in British Patent 737,086, especially in Table I thereof. The amount of oil employed in extending the rubber generally runs from 20 to 100 phr., although 30–60 phr. of oil is more usual. The rubbery polymers comprise at least 50% of a conjugated butadiene-1,3 hydrocarbon polymerized therein.

The examples show that a relatively small proportion of the finely divided inorganic pigment effectively stabilizes the oil-extended synthetic rubber. A preferred range of the pigment employed is from bout 0.5 to about 3.0 phr., although appreciable stabilization results from the addition of as little as 0.1 phr. of the pigment. Larger amounts of the pigment can be added in order to secure the stabilizing action of the invention, although qnntities above 3 phr. are ordinarily unnecessary to secure this desirable result; if the ultimate compounding formula does not conflict, higher proportions of the basic pigment can be added to stabilize the oil-extended rubber, quantities ranging as high as 5 phr. being operative.

In addition to the technique of admixing the finely divided inorganic pigment with a synthetic rubber latex, as illustrated above, the pigment can be admixed with the freshly produced oil-extended rubber in other manners. The pigment can be mixed with either the synthetic rubber latex or the oil dispersion prior to mixing the latter two dispersions together. Alternatively, the finely divided pigment, either as such or mixed with a non-aqueous solvent or other liquid, can be mixed with a non-aqueous solution or dispersion of the synthetic rubber, the extending oil or the oil-extended synthetic rubber. In addition, the pigment can be mechanically mixed or milled into the solid synthetic rubber, as on a rubber mill or in an internal rubber mixer, the rubber being either in the extended or unextended form; in the latter case the pigmented unextended synthetic rubber is then oil-extended by suitable admixture with an oil.

What is claimed is:
1. Method of producing a stabilized oil-extended butadiene-styrene copolymer synthetic rubber consisting essentially in admixing a freshly polymerized aqueous dispersion of said synthetic rubber with 20 to 100 phr. of extending oil and from 0.1 to 5 phr. of a finely divided inorganic rubber pigment selected from the group consisting of zinc oxide, magnesium oxide, calcium silicate and silicon dioxide; coagulating the mixture of pigment and dispersion of oil-extended synthetic rubber; and drying the resulting coagulum, whereby an unvulcanized oil-extended synthetic rubber containing substantially no sulfur and accelerator is obtained exhibiting improved stability against loss of its initial Mooney plasticity value upon aging during storage for several months.

2. The method of claim 1 in which the pigment is zinc oxide.

3. The method of claim 1 in which the pigment is silicon dioxide.

4. The method of claim 1 in which the pigment is calcium silicate.

5. The method of claim 1 in which the pigment is magnesium oxide.

References Cited in the file of this patent

UNITED STATES PATENTS

| 2,702,286 | Iknayan et al. | Feb. 15, 1955 |
| 2,760,894 | Wolf | Aug. 28, 1956 |
| 2,875,170 | Ayers et al. | Feb. 24, 1959 |

OTHER REFERENCES

"Rubber Age," March 1950, pages 663–666.